(12) United States Patent
Kato et al.

(10) Patent No.: US 10,759,263 B2
(45) Date of Patent: Sep. 1, 2020

(54) VIBRATION DAMPING DEVICE

(71) Applicant: SUMITOMO RIKO COMPANY LIMITED, Komaki-shi, Aichi (JP)

(72) Inventors: Kenichi Kato, Komaki (JP); Shuichi Nishimura, Komaki (JP); Yorishige Shimizu, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 17 days.

(21) Appl. No.: 16/220,638

(22) Filed: Dec. 14, 2018

(65) Prior Publication Data

US 2019/0255931 A1 Aug. 22, 2019

(30) Foreign Application Priority Data

Feb. 21, 2018 (JP) .................. 2018-028494

(51) Int. Cl.
*B60K 5/12* (2006.01)
*F16F 1/38* (2006.01)
*F16M 13/02* (2006.01)

(52) U.S. Cl.
CPC .......... *B60K 5/1208* (2013.01); *F16F 1/3863* (2013.01); *F16F 1/3849* (2013.01); *F16M 13/02* (2013.01)

(58) Field of Classification Search
CPC ...... F16F 1/3828; F16F 1/3849; F16F 1/3842; F16F 1/3863; B60K 5/1208

USPC ................. 267/140.13, 140.5, 141
See application file for complete search history.

(56) References Cited

U.S. PATENT DOCUMENTS

| | | | |
|---|---|---|---|
| 9,382,961 B2 | 7/2016 | Ishikawa et al. | |
| 2006/0043656 A1* | 3/2006 | Shimizu | F16F 1/3849 267/140.11 |
| 2015/0240901 A1* | 8/2015 | Ishikawa | F16F 1/38 248/634 |
| 2016/0341275 A1* | 11/2016 | Kaneko | F16F 15/08 |
| 2017/0074348 A1* | 3/2017 | Okajima | F16F 1/36 |
| 2017/0211648 A1 | 7/2017 | Kadowaki et al. | |

* cited by examiner

*Primary Examiner* — Thomas J Williams
(74) *Attorney, Agent, or Firm* — Oliff PLC

(57) ABSTRACT

A vibration damping device including: an inner member; an outer bracket including a tubular part having an inner hole, and an end wall covering an opening of the tubular part; an intermediate member having a bent part, and first and second attachments provided at opposite sides of the bent part, while being inserted in the inner hole such that the first attachment is superposed on an inner face of the tubular part while the second attachment is axially superposed on the end wall; a main rubber elastic body elastically connecting the tubular part and an end portion of the inner member inserted in the inner hole, and elastically connecting the inner member and the attachments of the intermediate member that are bonded thereto; first and second fixtures fixing the first and second attachments to the outer bracket, respectively.

6 Claims, 16 Drawing Sheets

VIBRATION DAMPING DEVICE

INCORPORATED BY REFERENCE

The disclosure of Japanese Patent Application No. 2018-028494 filed on Feb. 21, 2018 including the specification, drawings and abstract is incorporated herein by reference in its entirety.

BACKGROUND OF THE INVENTION

1. Field of the Invention

The present invention relates to a vibration damping device used for an automotive engine mount, etc., for example.

2. Description of the Related Art

There has been known a vibration damping device, as a type of vibration damping connector or vibration damping support interposed between components of a vibration transmission system such as a power unit and a vehicle body, for example, so as to mutually connect the components in a vibration-damping manner. This vibration damping device has a structure in which an inner member and an outer bracket are elastically connected by a main rubber elastic body, for example.

U.S. Pat. No. 9,382,961 discloses a vibration damping device having a structure wherein an inner member and an outer tubular member are elastically connected mutually in the axis-perpendicular direction by a main rubber elastic body, while the inner member and a support piece of the outer tubular member are elastically connected in the axial direction by a connecting rubber. The outer tubular member is press-fitted into a tubular part of a bracket member. According to the vibration damping device of U.S. Pat. No. 9,382,961, not only the spring characteristics in the axis-perpendicular direction but also the spring characteristics in the axial direction can be adjusted with a great degree of freedom by providing the connecting rubber.

However, in the vibration damping device disclosed in U.S. Pat. No. 9,382,961, an end portion of the inner member and the outer tubular member are elastically connected by the main rubber elastic body with the end portion inserted in the outer tubular member, and the main rubber elastic body is thus surrounded by the outer tubular member. When the main rubber elastic body is bonded by vulcanization to the outer tubular member, the division direction of the mold of the main rubber elastic body and the like are limited by the outer tubular member, so that the degree of freedom in the shape of the main rubber elastic body is restricted.

In the vibration damping device of U.S. Pat. No. 9,382,961, it is difficult to secure the outer tubular member press-fit into the tubular part of the bracket member, for example if the inner hole of the tubular part has a hole cross sectional shape partially edged like a rectangle. It is because the stress tends to concentrate on the angular portion of the outer tubular member corresponding to the inner hole of the tubular part.

U.S. Publication No. US 2017/0211648 discloses a vibration damping device having a structure in which an elastic body is directly bonded to an inside member and a tubular part of a bracket. However, in this vibration damping device described in US 2017/0211648, for example when bonding the elastic body to the inside member and the bracket by vulcanization adhesion, it is necessary to set the large and heavy bracket in a mold for the elastic body and mold the elastic body by vulcanization. This readily leads to a problem such as reduction in productivity.

SUMMARY OF THE INVENTION

It is therefore one object of the present invention to provide a vibration damping device of novel structure which is able to set the spring characteristics in the axis-perpendicular direction and in the axial direction with a great degree of freedom, and to easily connect an inner member and an outer bracket elastically by a main rubber elastic body, irrespective of a shape of an inner hole in a tubular part of the outer bracket.

The above and/or optional objects of this invention may be attained according to at least one of the following preferred embodiments of the invention. The following preferred embodiments and/or elements employed in each preferred embodiment of the invention may be adopted at any possible optional combinations.

A first preferred embodiment of the present invention provides a vibration damping device comprising: an inner member; an outer bracket including a tubular part having an inner hole, and an end wall covering an opening of the tubular part; an intermediate member having a bent part, and a first attachment and a second attachment provided at opposite sides of the bent part, the intermediate member being inserted in the inner hole of the tubular part of the outer bracket such that the first attachment is superposed on an inner face of the tubular part while the second attachment is axially superposed on the end wall of the outer bracket; a main rubber elastic body elastically connecting the tubular part of the outer bracket and an end portion of the inner member inserted in the inner hole of the tubular part, the main rubber elastic body elastically connecting the inner member and the intermediate member that are bonded thereto with each other, the main rubber elastic body being bonded to the first attachment and the second attachment; a first fixture of the first attachment at which the first attachment is fixed to the outer bracket; and a second fixture of the second attachment at which the second attachment is fixed to the outer bracket.

According to the vibration damping device having the structure following the first preferred embodiment as described above, the intermediate member bonded to the main rubber elastic body is provided with the first attachment and the second attachment at both sides of the bent part in structure. This increases the degree of freedom in the division direction of the mold of the main rubber elastic body, for example, compared with the case where the main rubber elastic body is formed radially inside a tubular member. Owing to this, the degree of freedom in the shape of the main rubber elastic body increases. Therefore, it is possible to more efficiently realize the required characteristics, and the vibration-damping performance and the durability can improve.

In addition, the inner member and the intermediate member are bonded to the main rubber elastic body. This eliminates the need to set the outer bracket in the mold. Consequently, even if the outer bracket is large, improvement in manufacturing efficiency and the like are achieved.

With the intermediate member inserted in the inner hole of the tubular part of the outer bracket, the first attachment and the second attachment are fixed to the outer bracket by the first fixture and the second fixture, respectively. Thus, the intermediate member is easily attached to the outer bracket irrespective of the shape of the tubular part, and the fixation strength of the intermediate member to the outer bracket is secured largely.

The first attachment of the intermediate member is overlapped with the inner face of the tubular part of the outer bracket, and the first attachment is fixed to the outer bracket by the first fixture. Meanwhile, the second attachment of the intermediate member is axially overlapped with the end wall of the outer bracket, and the second attachment is fixed to the outer bracket by the second fixture. Therefore, the deformation rigidity of the intermediate member is reinforced by the outer bracket. Furthermore, since the bent part is provided between the first attachment and the second attachment of the intermediate member, the deformation rigidity of the intermediate member can be advantageously secured.

A second preferred embodiment of the present invention provides the vibration damping device according to the first preferred embodiment, wherein the first fixture of the first attachment is disposed on an opposite side to the bent part in the first attachment, and the second fixture of the second attachment is disposed on an opposite side to the bent part in the second attachment.

According to the second preferred embodiment, since the first fixture and the second fixture are disposed at mutually separated positions, the fixation strength of the intermediate member to the outer bracket can be advantageously obtained. Besides, it is easy to secure a large bonding area of the main rubber elastic body, in the first attachment and the second attachment, whereby the spring characteristics of the main rubber elastic body and the like can be set with a greater degree of freedom.

A third preferred embodiment of the present invention provides the vibration damping device according to the first or second preferred embodiment, wherein the inner hole of the tubular part in the outer bracket has a rectangular cross section.

With the third preferred embodiment, the inner hole of the tubular part can be largely secured with excellent space efficiency, and the main rubber elastic body disposed in the inner hole of the tubular part can be formed with a great degree of freedom. In addition, the first fixture and the second fixture are fixed to the outer bracket in structure. Therefore, it is possible to effectively fix the intermediate member, even to the outer bracket having an inner hole with a rectangular cross section, to which fixation of the intermediate member by press-fitting tends to be difficult.

A fourth preferred embodiment of the present invention provides the vibration damping device according to any one of the first to third preferred embodiments, wherein at least one of the first fixture and the second fixture has a clinching claw, while a clinching hole is provided in the outer bracket, and the clinching claw is inserted through the clinching hole and fastened by clinching to the outer bracket.

According to the fourth preferred embodiment, the intermediate member can be easily fixed to the outer bracket without requiring another member such as a bolt, by the clinching claw provided at the intermediate member and the clinching hole provided in the outer bracket.

A fifth preferred embodiment of the present invention provides the vibration damping device according to any one of the first to fourth preferred embodiments, wherein the first fixture extends radially outside at an axial outside of the tubular part of the outer bracket, and the first fixture is axially superposed on and fixed to the outer bracket.

With the fifth preferred embodiment, the first fixture that fixes the first attachment of the intermediate member to the outer bracket is axially overlapped with the outer bracket. Thus, the first attachment superposed on the inner face of the outer bracket can be easily fixed to the outer bracket by the first fixture.

A sixth preferred embodiment of the present invention provides the vibration damping device according to any one of the first to fifth preferred embodiments, wherein the first attachment includes a protrusion protruding to each of opposite sides in a peripheral direction of the tubular part of the outer bracket, and the main rubber elastic body is bonded to the protrusion.

According to the sixth preferred embodiment, by adjusting the protruding dimension, the axial width dimension, and the like of each protrusion, it is possible to adjust the bonding area of the main rubber elastic body to the first attachment and the inclination of the main elastic axis, etc. As a result, it is possible to tune the spring characteristics of the main rubber elastic body.

A seventh preferred embodiment of the present invention provides the vibration damping device according to the sixth preferred embodiment, wherein a protruding dimension of the protrusion changes in a part where the main rubber elastic body is bonded.

With the seventh preferred embodiment, the spring characteristics of the main rubber elastic body can be adjusted by changing the protruding dimension of each protrusion in the part where the main rubber elastic body is bonded.

According to the present invention, the intermediate member bonded to the main rubber elastic body has a structure in which the first attachment and the second attachment are provided at both sides of the bent part. Consequently, for example when the intermediate member is bonded by vulcanization to the main rubber elastic body, the degree of freedom in the division direction of the mold becomes large, thereby improving the degree of freedom in the shape of the main rubber elastic body. This makes it possible to more efficiently realize the required characteristics. Besides, the bent part is provided between the first attachment and the second attachment of the intermediate member. The first attachment of the intermediate member is superposed on the inner face of the tubular part of the outer bracket, while the second attachment of the intermediate member is axially superposed on the end wall of the outer bracket, so that the deformation rigidity of the intermediate member is advantageously secured. Furthermore, the first attachment of the intermediate member is fixed to the outer bracket by the first fixture, while the second attachment of the intermediate member is fixed to the outer bracket by the second fixture. Therefore, the fixation strength of the intermediate member to the outer bracket is secured largely.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein.

DETAILED DESCRIPTION OF PRACTICAL EMBODIMENTS

Figure 1:
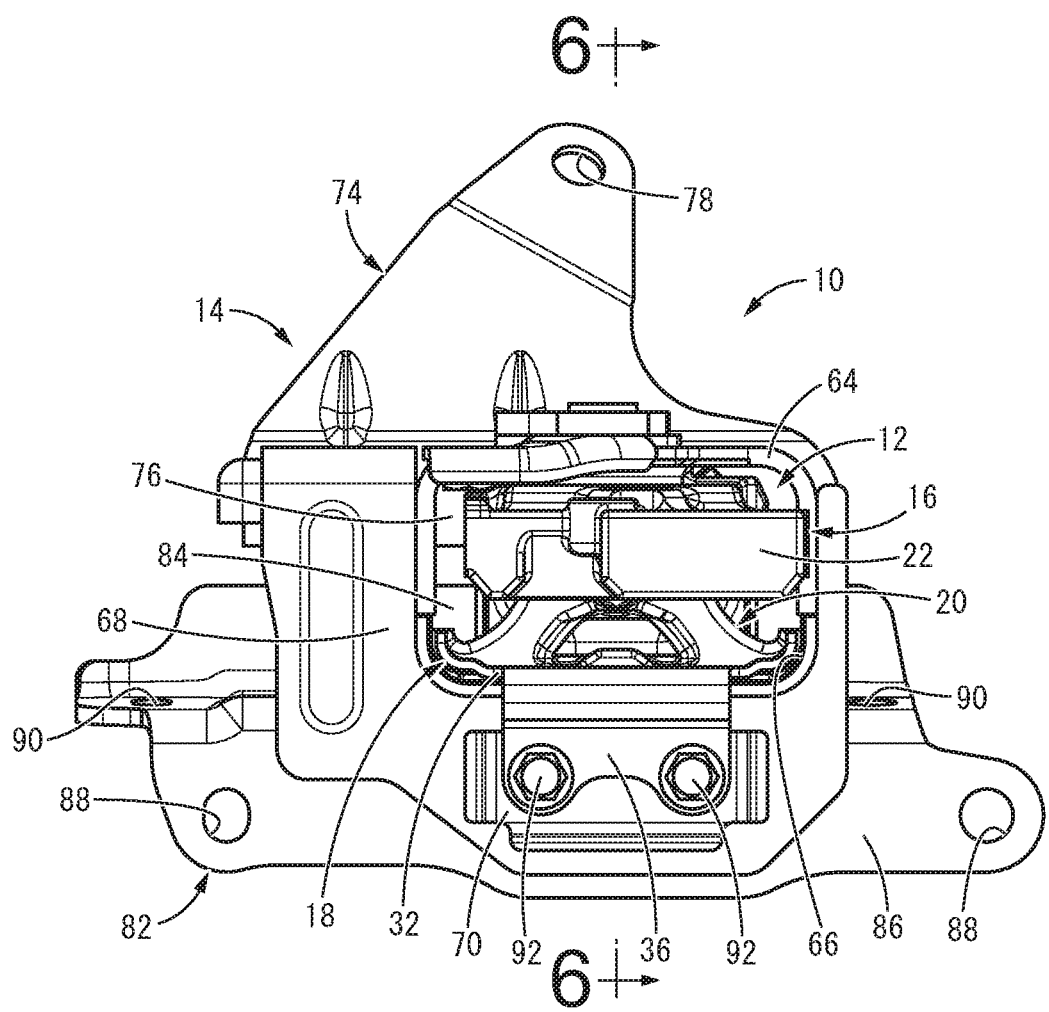
FIG. 1 is a front view showing a vibration damping device in the form of an engine mount as a first practical embodiment of the present invention.
Figure 2:
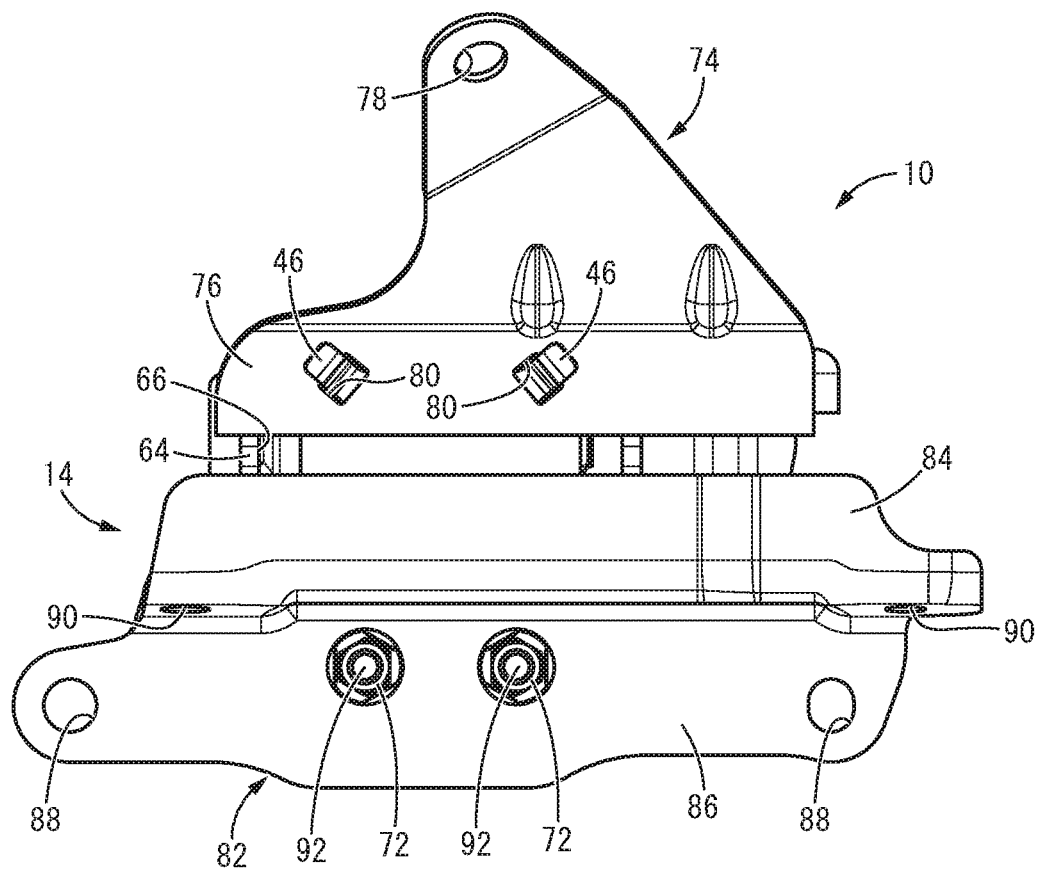
FIG. 2 is a rear view of the engine mount shown in FIG. 1.
Figure 3:
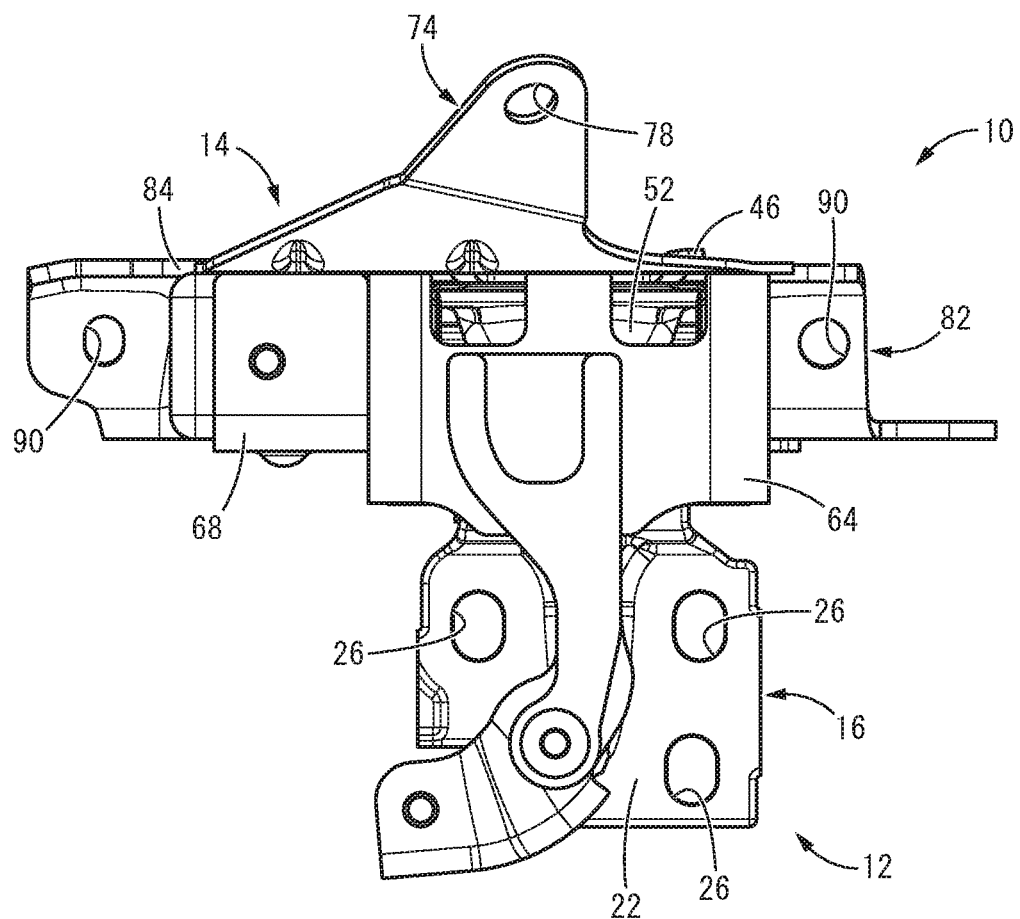
FIG. 3 is a plan view of the engine mount shown in FIG. 1.
Figure 4:
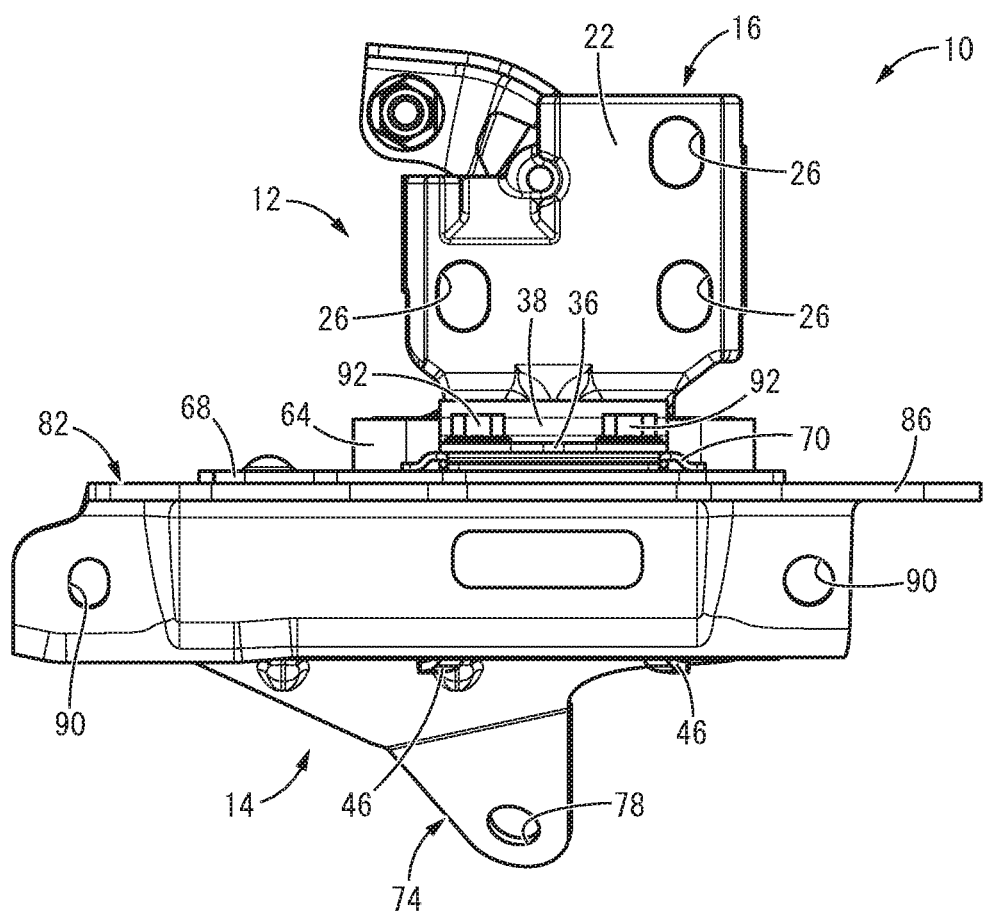
FIG. 4 is a bottom view of the engine mount shown in FIG. 1.
Figure 5:
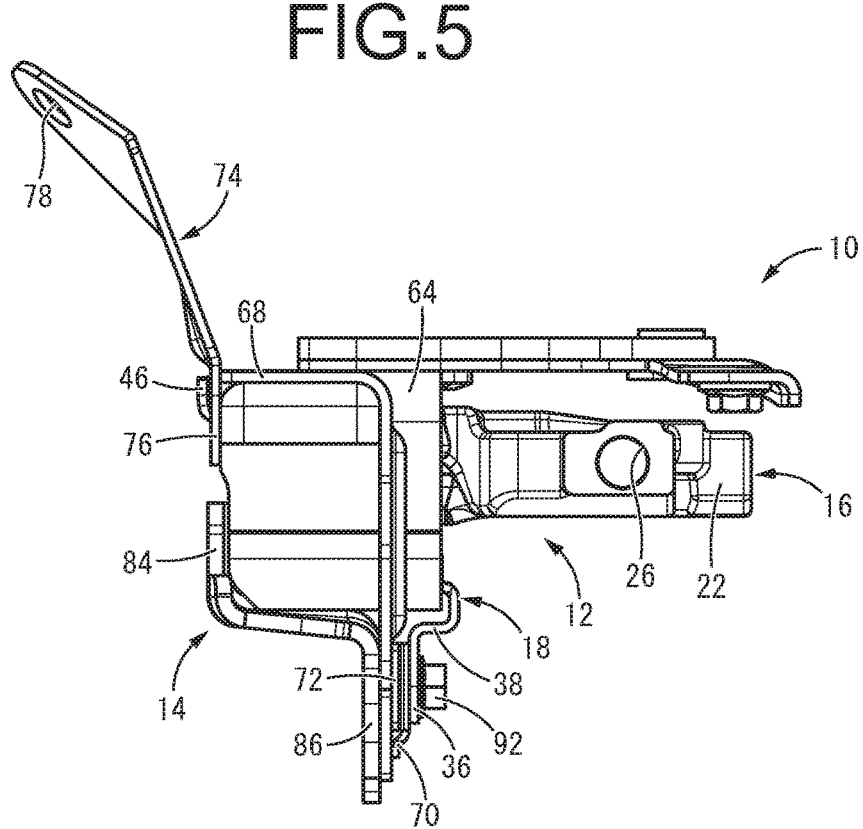
FIG. 5 is a left side view of the engine mount shown in FIG. 1.

Hereinafter, a practical embodiment of the present invention will be described with reference to the drawings.

FIGS. 1 to 6 show an automotive engine mount 10 as a first practical embodiment of a vibration damping device structured according to the present invention. The engine mount 10 has a structure in which a mount main unit 12 is attached to an outer bracket 14. As shown in FIGS. 7 to 12, the mount main unit 12 has a structure wherein an inner member 16 and an intermediate member 18 are elastically connected by a main rubber elastic body 20. In the following description, as a general rule, the up-down direction means the up-down direction in FIG. 1, the front-back direction means the direction orthogonal to the paper face in FIG. 1, and the left-right direction means the left-right direction in FIG. 1.

More specifically, the inner member 16 is a high rigidity member made of metal or the like. As shown in enlarged views of FIGS. 13 to 17, the inner member 16 integrally includes a fastening portion 22 in a thick plate shape and a bonded portion 24 projecting backward from the fastening portion 22. In addition, a plurality of bolt holes 26 are formed through the fastening portion 22 so that the fastening portion 22 is fixed to a not-shown power unit by not-shown bolts inserted through the bolt holes 26. However, the concrete structure of the fastening portion 22 shown in this practical embodiment is merely an example and can be changed as appropriate according to the attachment structure on the power unit side. Meanwhile, the bonded portion 24 has a substantially rectangular block shape as a whole. Additionally, a convex part 28 is formed integrally with the bonded portion 24, while protruding toward the back side opposite to the fastening portion 22. The inner member 16 can be obtained by molding, for example.

Figure 12:
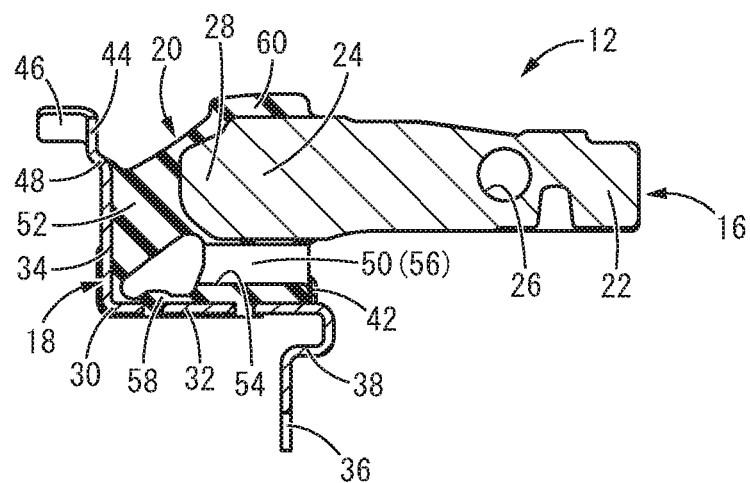
FIG. 12 is a cross sectional view taken along line 12-12 of FIG. 7.
Figure 13:
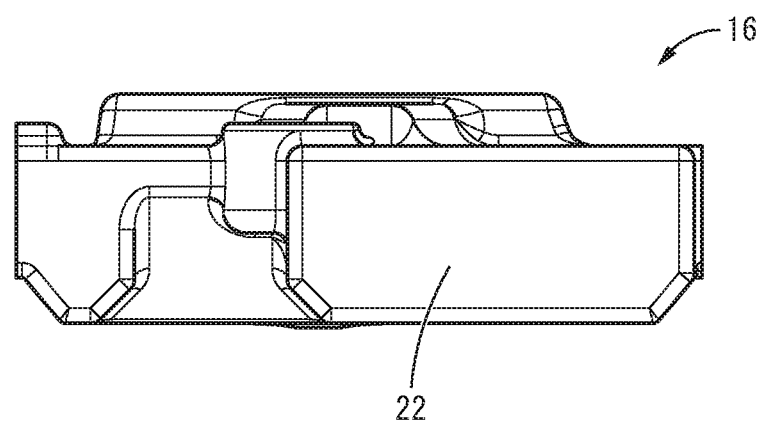
FIG. 13 is an enlarged front view showing an inner member constituting the mount main unit shown in FIG. 7.
Figure 14:
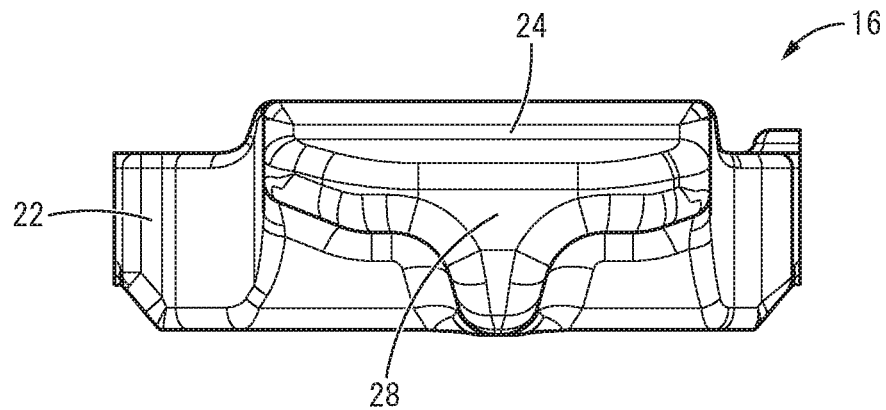
FIG. 14 is a rear view of the inner member shown in FIG. 13.
Figure 15:
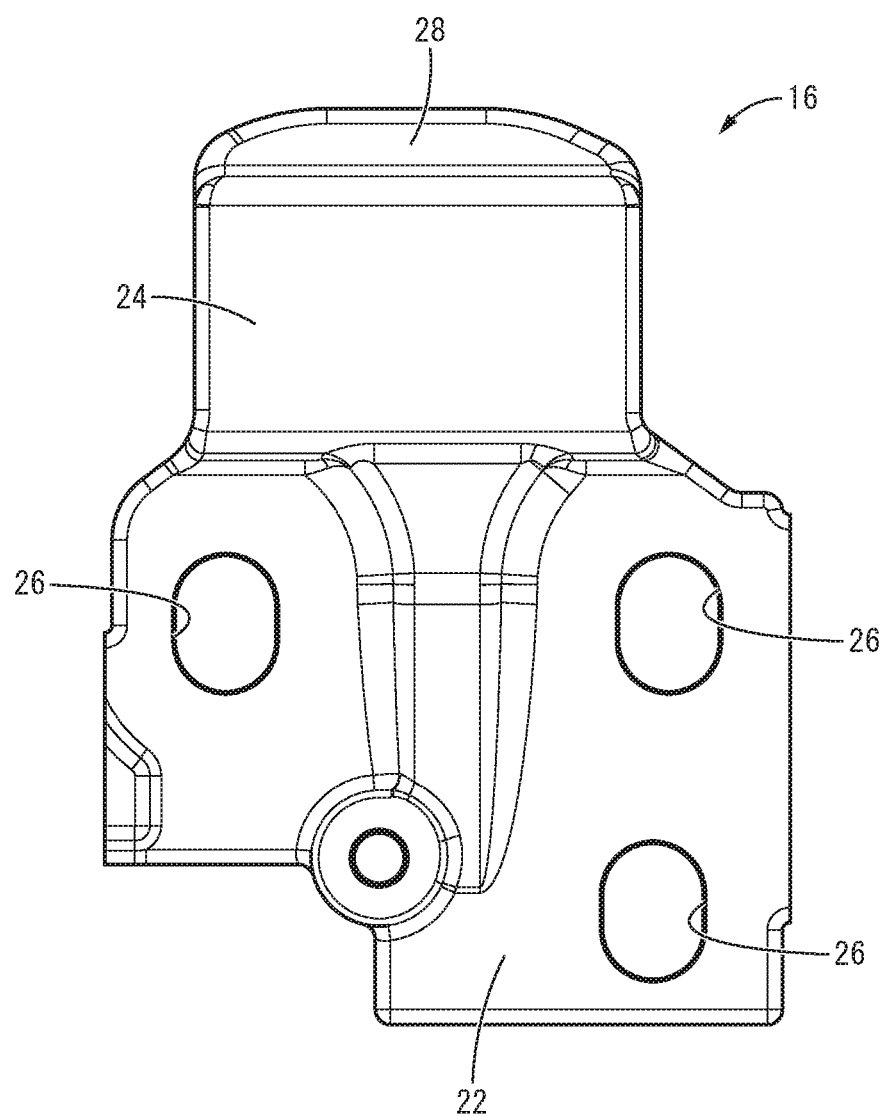
FIG. 15 is a plan view of the inner member shown in FIG. 13.
Figure 16:
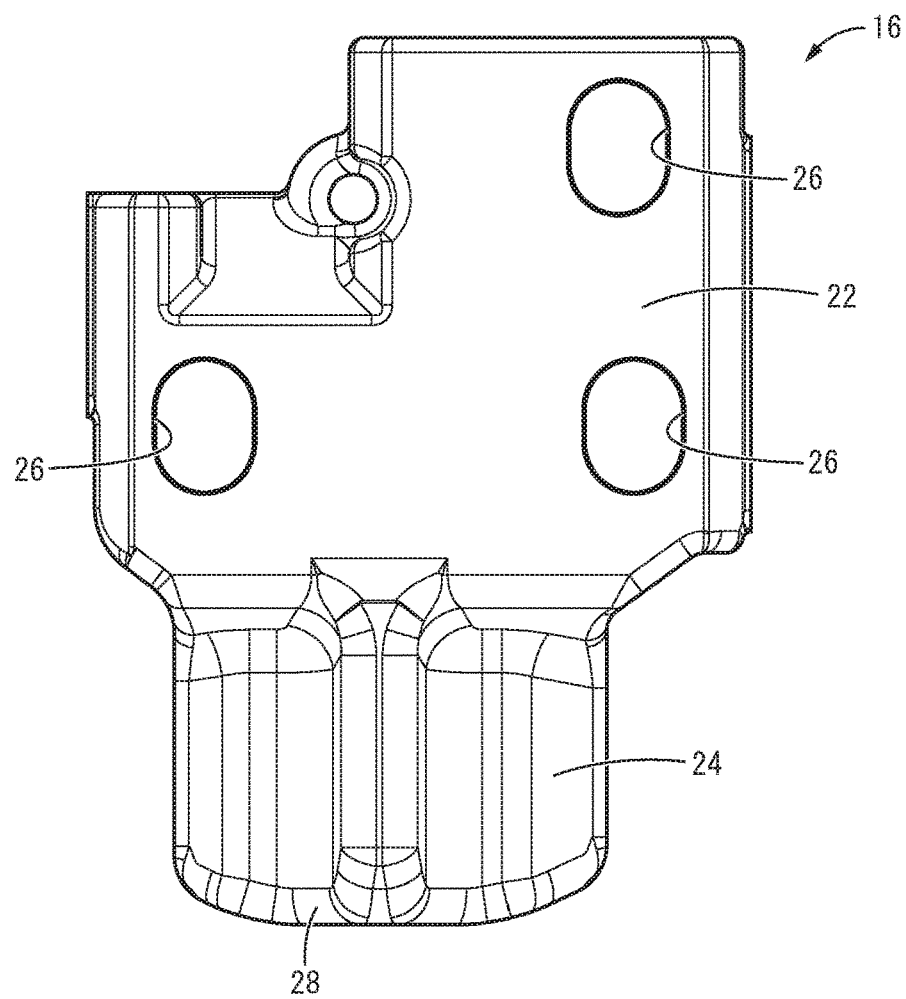
FIG. 16 is a bottom view of the inner member shown in FIG. 13.
Figure 17:
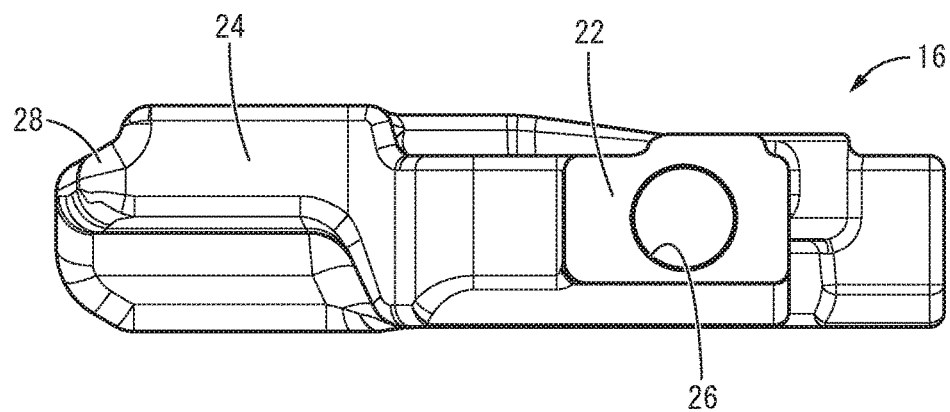
FIG. 17 is a left side view of the inner member shown in FIG. 13.
Figure 18:
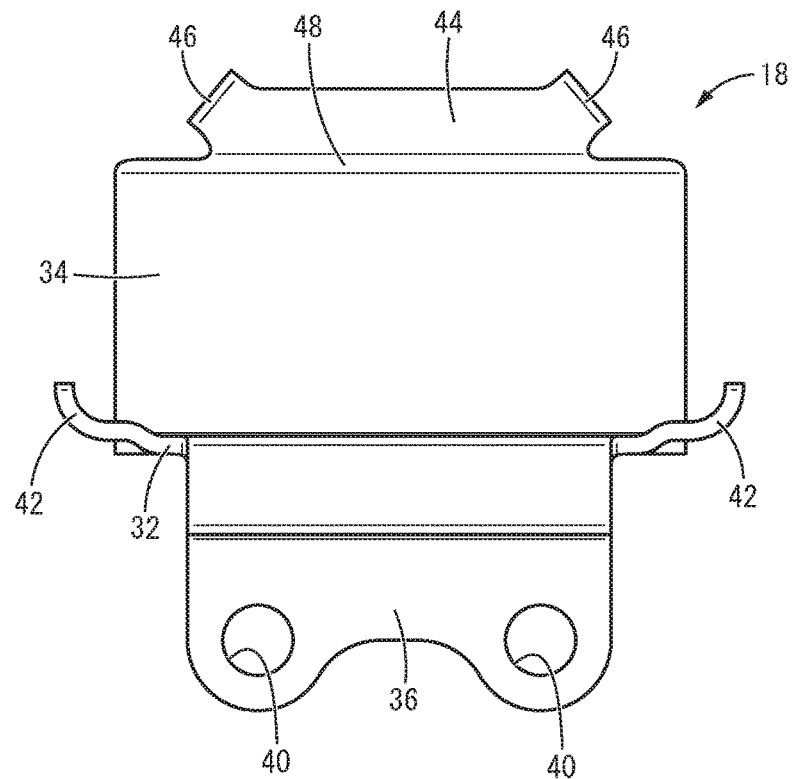
FIG. 18 is an enlarged front view showing an intermediate member constituting the mount main unit shown in FIG. 7.
Figure 19:
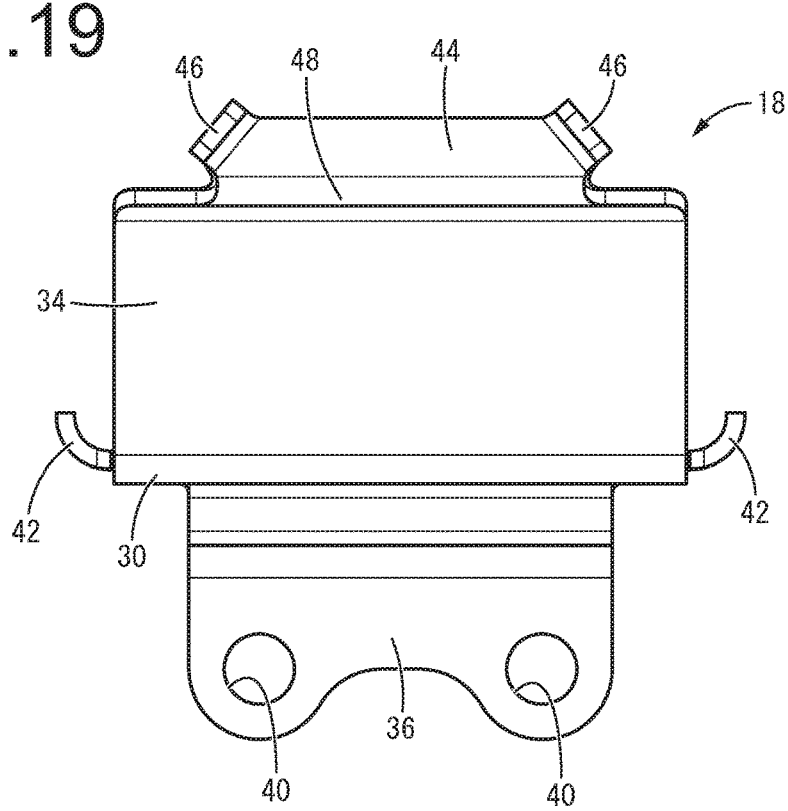
FIG. 19 is a rear view of the intermediate member shown in FIG. 18.
Figure 20:
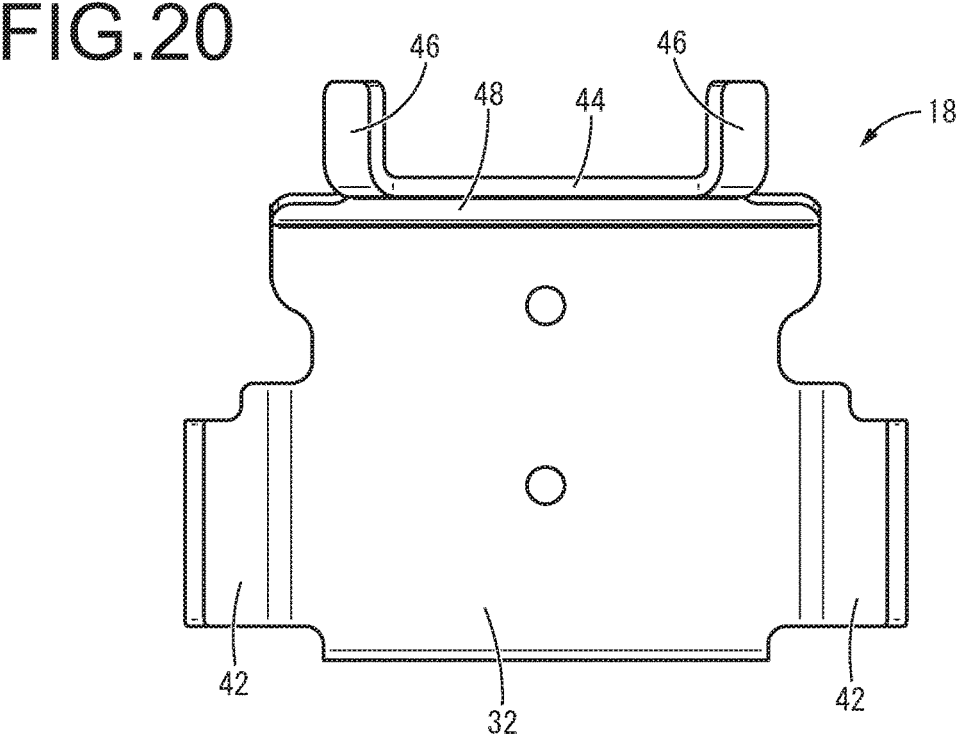
FIG. 20 is a plan view of the intermediate member shown in FIG. 18.
Figure 21:
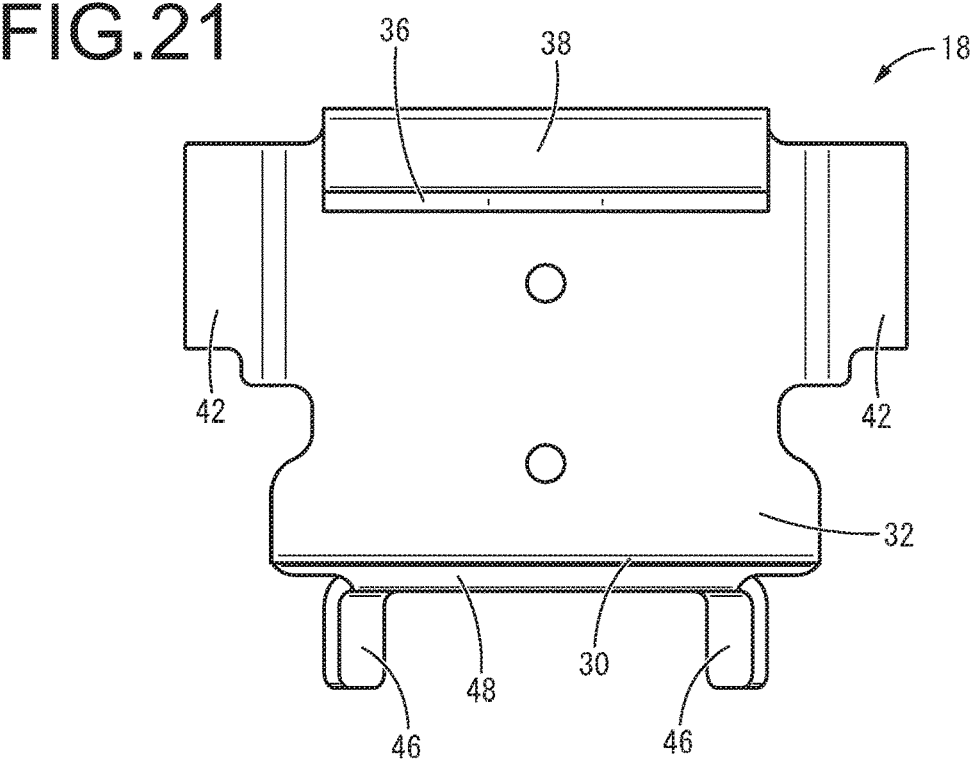
FIG. 21 is a bottom view of the intermediate member shown in FIG. 18.
Figure 22:
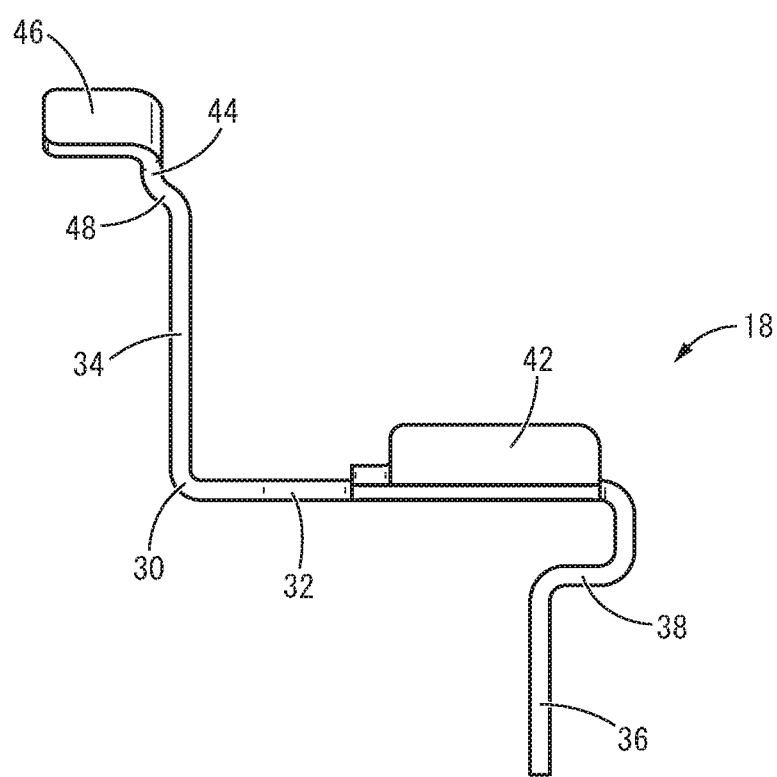
FIG. 22 is a left side view of the intermediate member shown in FIG. 18.

As shown in FIG. 12, the intermediate member 18 has a cross sectional shape bent in a substantially L-shape. As shown also in FIGS. 18 to 22, the intermediate member 18 has a first attachment 32 and a second attachment 34 at opposite sides of a bent part 30. The intermediate member 18 of the present practical embodiment is integrally formed as a whole with a press fitting.

The first attachment 32 has a flat plate shape which expands substantially orthogonally to the up-down direction, and a first fixture 36 is integrally formed at the end portion opposite to the bent part 30. The first fixture 36 has a width dimension extending as long as almost the entire flat central portion in the width direction in the first attachment 32. The first fixture 36 extends downward, i.e., radially outside, at the front end portion which is the end portion on the opposite side to the bent part 30 in the first attachment 32. In this practical embodiment, a folded part 38 is formed in the middle portion of the first attachment 32 in the up-down direction, and the lower portion of the first attachment 32 below the folded part 38 is located on the back side (the left side in FIG. 22) of the upper portion thereof. Besides, bolt holes 40 are formed through the lower portion of the first fixture 36 below the folded part 38, in the front-back direction. In the present practical embodiment, two bolt holes 40, 40 are provided apart from each other in the left-right direction. In the present practical embodiment, the folded part 38 is provided in the first fixture 36, whereby the front end portion of the first attachment 32, the upper portion of the first fixture 36, and the folded part 38 constitute a concave groove structure that opens backward and extends in the left-right width direction. This concave groove structure improves the deformation rigidity of the first fixture 36 and also prevents the head portions of later-described bolts 92 inserted through the bolt holes 40 from largely projecting forward. However, the folded part 38 is not indispensable in the present invention.

Moreover, protrusions 42 protruding to the left-right outside are respectively provided at both left and right end portions of the first attachment 32. The protrusions 42 are provided at the front side portion of the first attachment 32, and they gradually incline upward as they go toward the left-right outside. The protrusions 42 gradually rise as they go toward the left-right outside, and each has a curved shape whose inclination angle increases relative to the left-right direction. The protrusions 42 extend in the peripheral direction of an inner hole 66, roughly corresponding to the corner portion of the inner hole 66 of the outer bracket 14 which will be described later. Furthermore, in the present practical embodiment, both the protruding width dimension in the left-right direction and the protruding height dimension in the upward direction as the protruding dimension of the protrusion 42 from the first attachment 32 are larger in the front side than in the back side. The protruding dimension of the protrusion 42 may be different in at least one of the left-right direction and the upward direction.

The second attachment 34 has a flat plate shape which expands substantially orthogonally to the front-back direction, and a second fixture 44 is provided at the upper end portion which is the end portion on the opposite side to the bent part 30. The second fixture 44 is in the form of a plate whose dimension in the left-right direction is smaller than that of the lower portion of the second attachment 34. In the present practical embodiment, the second fixture 44 has clinching claws 46, at both sides in the left-right direction of the upper end portion thereof. The clinching claw 46 has a roughly rectangular plate shape and extends to the back side, at both left and right end portions of the second fixture 44. The clinching claw 46 tilts without being orthogonal to any of the up-down direction and the left-right direction. In this practical embodiment, a step 48 is provided at the middle portion of the second attachment 34, and the portion of the second attachment 34 upper than the step 48 is the second fixture 44. By forming this step 48, the deformation rigidity of the second attachment 34 improves, and the second fixture 44 is located behind the lower portion of the second attachment 34.

The bonded portion 24 of the inner member 16 is arranged to face the first attachment 32 of the intermediate member 18 in the up-down direction and it is arranged to face the second attachment 34 of the intermediate member 18 in the front-back direction. The opposing faces of the bonded portion 24 of the inner member 16 and each of the first and second attachments 32, 34 of the intermediate member 18 are elastically connected by the main rubber elastic body 20. The fastening portion 22 of the inner member 16 protrudes forward from the main rubber elastic body 20 to be exposed.

The main rubber elastic body 20 integrally includes a first connecting portion 50 elastically connecting the bonded portion 24 of the inner member 16 and the first attachment 32 of the intermediate member 18 in the up-down direction. Additionally, the main rubber elastic body 20 integrally includes a second connecting portion 52 elastically connecting the bonded portion 24 of the inner member 16 and the second attachment 34 of the intermediate member 18 in the front-back direction.

Figure 7:
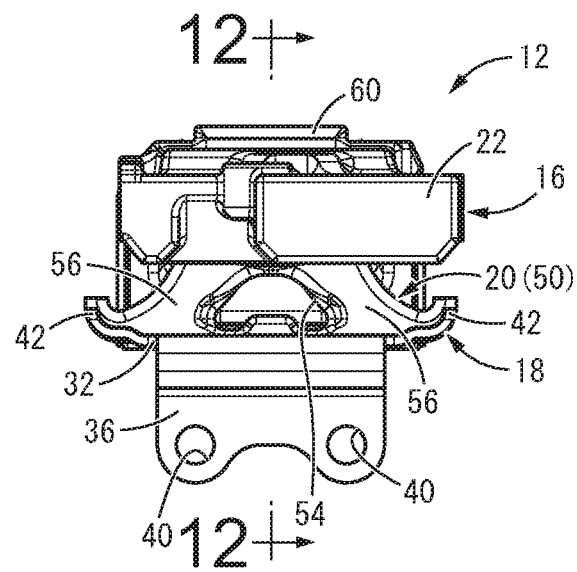
FIG. 7 is a front view of a mount main unit constituting the engine mount shown in FIG. 1.
Figure 8:
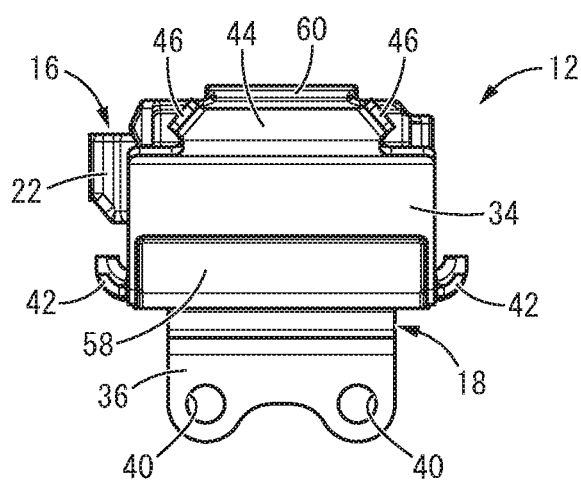
FIG. 8 is a rear view of the mount main unit shown in FIG. 7.
Figure 9:
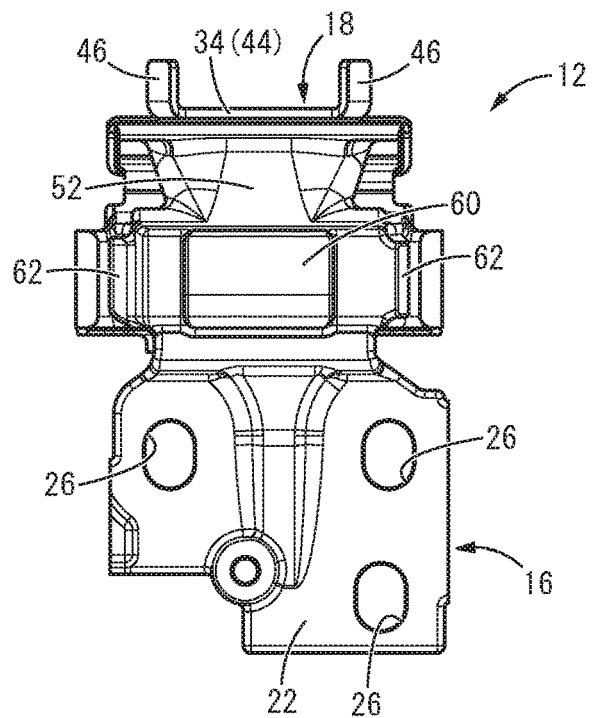
FIG. 9 is a plan view of the mount main unit shown in FIG. 7.
Figure 10:
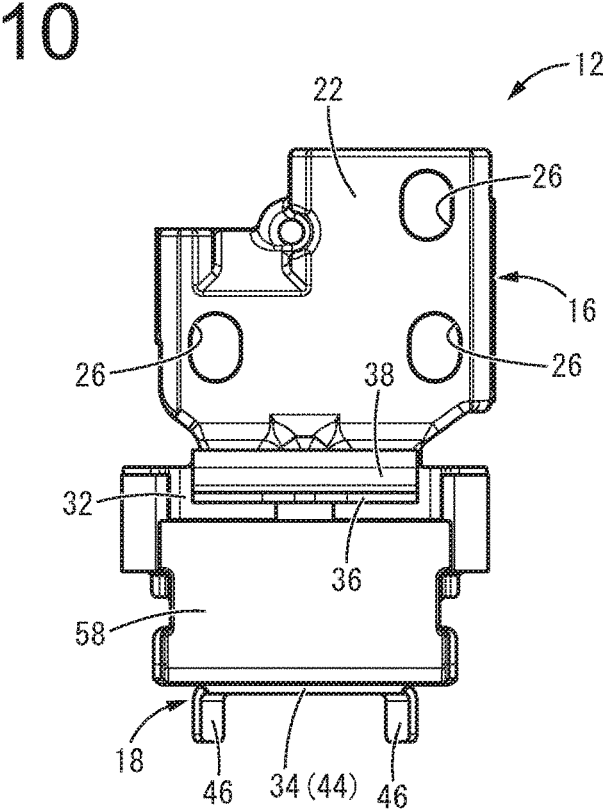
FIG. 10 is a bottom view of the mount main unit shown in FIG. 7.

The first connecting portion 50 is formed in a thick, almost plate shape spreading substantially orthogonally to the front-back direction. As shown in FIG. 7, the first connecting portion 50 is tapered such that the left-right dimension gradually increases as it goes toward the lower side. Further, a through hole 54 is formed penetrating in the front-back direction through the left-right central portion of the first connecting portion 50, so that a pair of rubber legs 56, 56 are formed at both left and right sides of the through hole 54 while extending in such directions that they are inclined to the left-right outside as they go to the lower side. The upper end of the first connecting portion 50 is bonded by vulcanization to the bonded portion 24 of the inner member 16, while the lower end thereof is bonded by vulcanization to the first attachment 32 of the intermediate member 18. The first connecting portion 50 of the main rubber elastic body 20 is bonded to the front portion of the first attachment 32, and the left and right ends of the lower end portion of the first connecting portion 50 are bonded to the protrusions 42, 42 of the first attachment 32. The upper face of the back portion of the first attachment 32 is covered by a covering rubber 58 formed integrally with the first connecting portion 50. The covering rubber 58 is also formed to cover the lower face of the back portion of the first attachment 32 and the back face of the lower portion of the second attachment 34.

Figure 11:
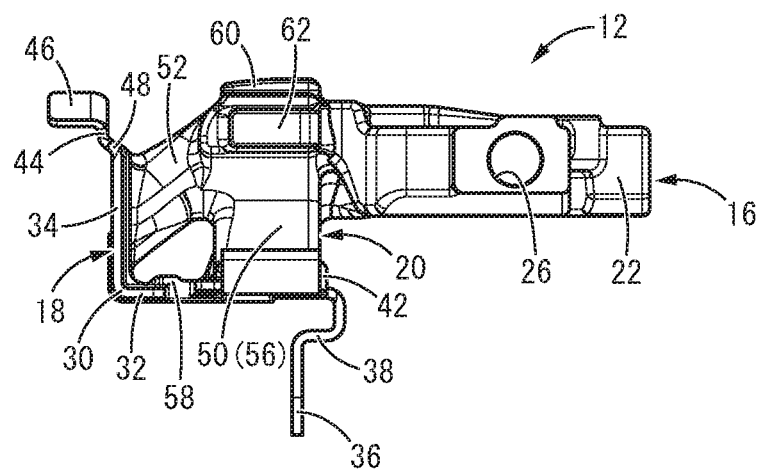
FIG. 11 is a left side view of the mount main unit shown in FIG. 7.

As shown in FIGS. 11 and 12, the second connecting portion 52 has a nearly inclined plate shape extending in the front-back direction and gradually inclining downward as it goes backward. In the second connecting portion 52, the front end portion is bonded by vulcanization to the bonded portion 24 of the inner member 16, while the back end portion is bonded by vulcanization to the second attachment 34 of the intermediate member 18. Since the front end portion of the second connecting portion 52 is bonded to the back face of the bonded portion 24 where the convex part 28 protrudes, the spring characteristics of the second connecting portion 52 is adjusted by the convex part 28.

An upper stopper rubber 60 formed integrally with the main rubber elastic body 20 is bonded to the upper face of the bonded portion 24 of the inner member 16. Side stopper rubbers 62, 62 formed integrally with the main rubber elastic body 20 are bonded to the left-right outer faces of the bonded portion 24 of the inner member 16.

As shown in FIGS. 1 to 6, the outer bracket 14 is attached to the mount main unit 12 having such a structure. The outer bracket 14 is a high rigidity member made of metal such as iron, for example, and has a tubular part 64.

Figure 23:
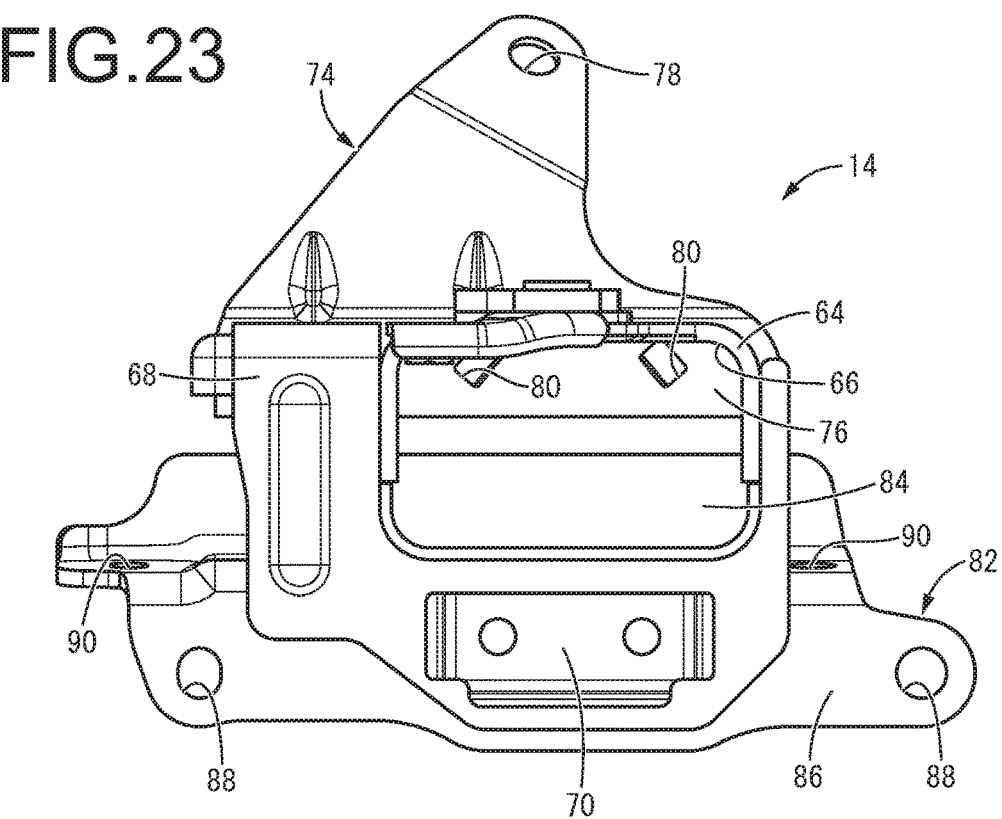
FIG. 23 is a front view of an outer bracket constituting the engine mount shown in FIG. 1.
Figure 24:
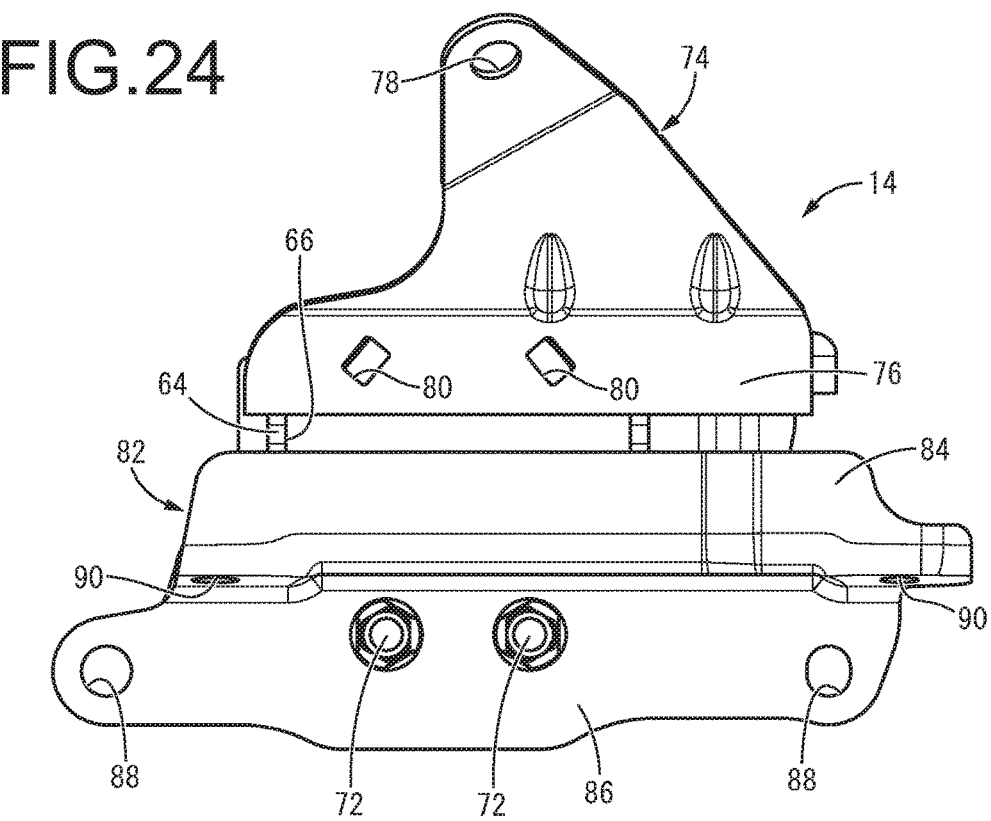
FIG. 24 is a rear view of the outer bracket shown in FIG. 23.

As also shown in FIGS. 23 and 24, the tubular part 64 is formed in a substantially rectangular tubular shape with its corner portions rounded. The tubular part 64 has the inner hole 66 having a generally rounded rectangular cross section while penetrating in the front-back direction. In the tubular part 64 of this practical embodiment, the front end of the upper side portion in the inner face has an inclined face which is inclined upward as it goes to the front side. When inserting the mount main unit 12 into the tubular part 64 as described later, the upper end portion of the mount main unit 12 is hardly caught by the front end of the tubular part 64.

Further, a connecting member 68 is fixed to the tubular part 64 by a means such as welding. The connecting member 68 is secured to the left and right side faces and the lower face in the outer peripheral face of the tubular part 64 and spreads to the left and right sides and the lower side of the tubular part 64. The upper end portion of the connecting member 68 is bent on the left side of the tubular part 64 and extends out backward. In addition, the connecting member 68 is provided with a fixture receiving seat 70 that is superposed on the front face of the connecting member 68 in the lower side than the tubular part 64 so as to project forward. Two bolt holes are formed penetrating the fixture receiving seat 70 in the front-back direction, and nuts 72, 72 are fixed to the back face of the fixture receiving seat 70 by a means like welding. Screw holes of the nuts 72, 72 are opened to the front face of the fixture receiving seat 70 through bolt holes penetrating the fixture receiving seat 70.

A first fastening member 74 is fixed to the tubular part 64 and the connecting member 68 by a means such as welding. The first fastening member 74 has an upper end wall 76 as an end wall that covers the upper portion of the back opening of the tubular part 64 and a bolt hole 78 penetrating the upper end portion thereof in the thickness direction. In the upper end wall 76 of the first fastening member 74, clinching holes 80, 80 corresponding to the clinching claws 46, 46 of the intermediate member 18 are formed through it in the front-back direction. The first fastening member 74 is fixed to the back end portion of the tubular part 64 and the upper end portion of the connecting member 68.

A second fastening member 82 is fixed to the tubular part 64 and the connecting member 68 by a means such as welding. The second fastening member 82 has a lower end wall 84 that covers the lower portion of the back opening of the tubular part 64. A fastening piece 86 that is located below the lower end wall 84 is provided with bolt holes 88 formed penetrating through both left and right end portions thereof in the front-back direction. The second fastening member 82 is fixed to the back end portion of the tubular part 64 and the lower end portion of the connecting member 68. In the second fastening member 82 of the present practical embodiment, the lower end wall 84 and the fastening piece 86 are disposed at different positions in the front-back direction. Thus, the second fastening member 82 has a stepped plate shape integrally formed by bending a blank plate through press working, with its deformation rigidity improved. Besides, in the present practical embodiment, bolt holes 90 are formed through the left and right end portions of the bent section connecting the lower end wall 84 and the fastening piece 86 of the second fastening member 82.

It is possible to change as appropriate the specific shapes of the first fastening member 74 and the second fastening member 82 and the arrangement and the number of the bolt holes 78, 88, 90 in the first fastening member 74 and the second fastening member 82, and the like, according to the mounting structure on the vehicle body side, the specific shapes of the tubular part 64 and the connecting member 68, and the like.

Figure 6:
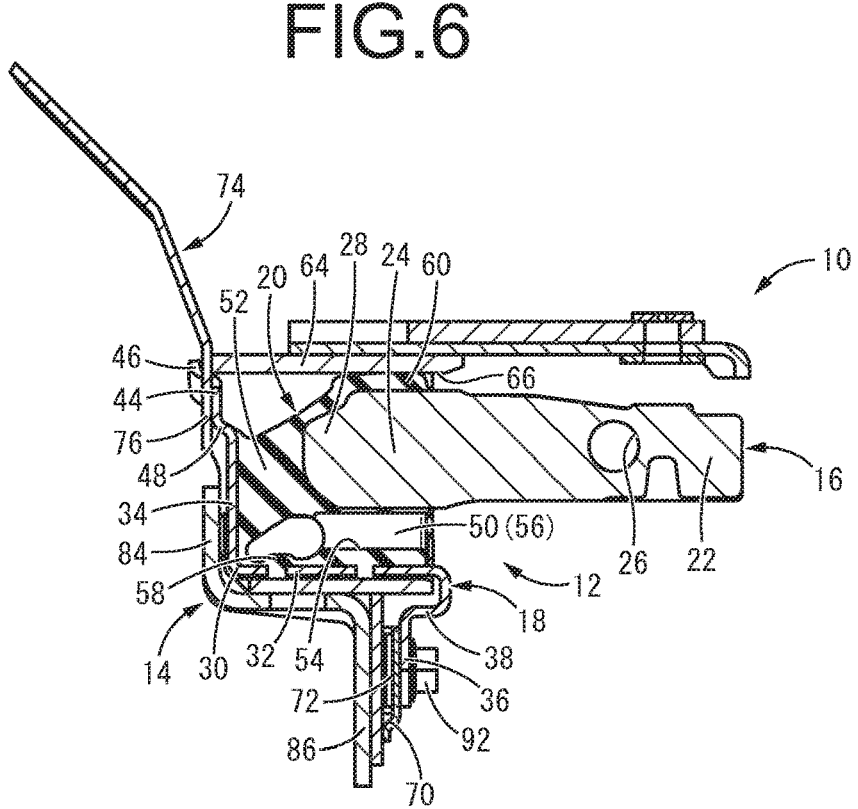
FIG. 6 is a cross sectional view taken along line 6-6 of FIG. 1.
Figure 25:
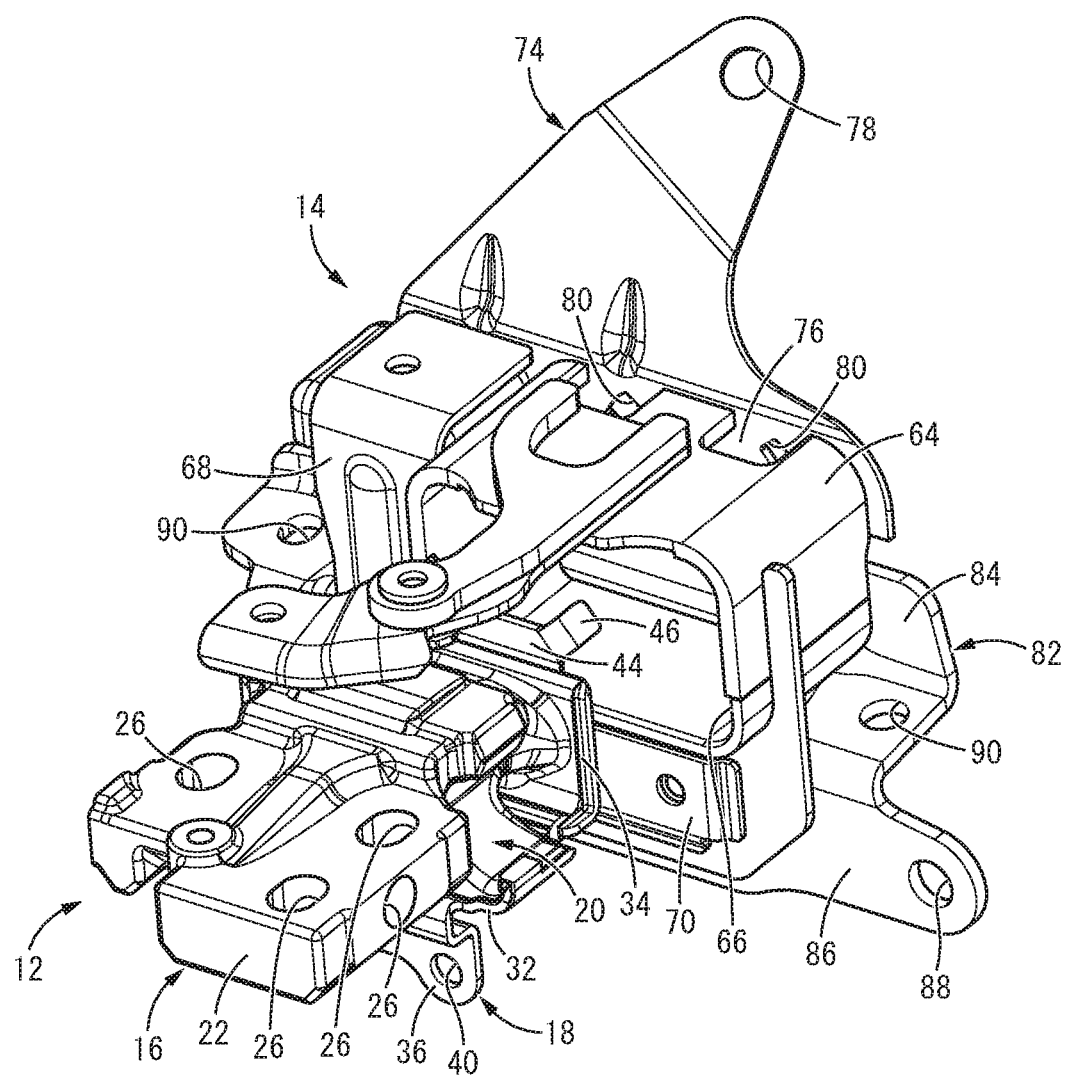
FIG. 25 is a perspective view suitable for explaining assembly of the mount main unit shown in FIG. 7 and the outer bracket shown in FIG. 23.

As shown in FIG. 25, the outer bracket 14 having such a structure is attached to the mount main unit 12 by inserting the mount main unit 12 from the front side into the inner hole 66 of the tubular part 64. Specifically, the intermediate member 18 of the mount main unit 12 is inserted without being press-fitted into the inner hole 66 of the tubular part 64 of the outer bracket 14. As shown in FIG. 6, the first attachment 32 of the intermediate member 18 is superposed on the lower side portion in the inner face of the tubular part 64, while the second attachment 34 of the intermediate member 18 is axially superposed on the upper end wall 76, at the upper end portion thereof constituting the second fixture 44. The first fixture 36 of the intermediate member 18 is axially superposed on the front face of the fixture receiving seat 70 provided in the connecting member 68. The bolts 92, 92 are inserted through the bolt holes 40, 40 of the first fixture 36 and threaded onto the nuts 72, 72 welded to the back face of the fixture receiving seat 70. By so doing, the first attachment 32 of the intermediate member 18 is fixed to the outer bracket 14. Moreover, the clinching claws 46 provided in the second fixture 44 of the intermediate member 18 are inserted through the clinching holes 80 of the upper end wall 76, and the portions protruding rearward beyond the upper end wall 76 are folded. Thus, the clinching claws 46 are fastened by clinching to the upper end wall 76 such that the clinching claws 46 are engaged therein axially, so that the second attachment 34 of the intermediate member 18 is fixed to the outer bracket 14.

In this manner, by fixing the first attachment 32 and the second attachment 34 to the outer bracket 14, the intermediate member 18 is fixed to the outer bracket 14, thereby constituting the engine mount 10 of the structure wherein the outer bracket 14 is mounted to the mount main unit 12. In the engine mount 10, with the bonded portion 24, which constitutes the end portion of the inner member 16, inserted in the inner hole 66 of the tubular part 64 of the outer bracket 14, the inner member 16 and the tubular part 64 of the outer bracket 14 are elastically connected to each other by the main rubber elastic body 20.

For the engine mount 10, the inner member 16 is attached to a not-shown power unit by not-shown bolts inserted through the respective bolt holes 26 provided in the fastening portion 22. Meanwhile, the outer bracket 14 is attached to a not-shown vehicle body, by a not-shown bolt inserted through the bolt hole 78 of the first fastening member 74 and the bolt holes 88, 90 of the second fastening member 82. As a result, the power unit and the vehicle body of the automobile are connected by the engine mount 10 in a vibration-damping manner.

When the outer bracket 14 is attached to the mount main unit 12, the bonded portion 24, which is the back end portion of the inner member 16 of the mount main unit 12, is inserted in the tubular part 64 of the outer bracket 14. Thus, the inner member 16 of the mount main unit 12 is disposed radially inside the tubular part 64. As a result, the bonded portion 24 of the inner member 16 and the tubular part 64 of the outer bracket 14 get into contact via the upper stopper rubber 60, thereby constituting a rebound stopper that limits the displacement amount of the inner member 16 to the upper side relative to the outer bracket 14. Also, the bonded portion 24 of the inner member 16 and the tubular part 64 of the outer bracket 14 get into contact via the side stopper rubbers 62, thereby constituting a side stopper that limits the relative displacement amount in the left-right direction of the inner member 16 and the outer bracket 14.

In the engine mount 10 having the structure according to the present practical embodiment as described above, the intermediate member 18 has a bent plate shape in which the first attachment 32 and the second attachment 34 are integrally continuous by the bent part 30. Therefore, when the main rubber elastic body 20 is formed as an integrally vulcanization molded component incorporating the intermediate member 18, the division direction of the mold of the main rubber elastic body 20 is hardly limited by the intermediate member 18, whereby the degree of freedom in the shape of the main rubber elastic body 20 becomes greater. Therefore, the degree of freedom in tuning of the spring characteristics of the main rubber elastic body 20 is accordingly increased, and the required vibration-damping characteristics can be realized more efficiently. In particular, the intermediate member 18 of the present practical embodiment has a plate shape that is bent in an L character shape, so that it is possible to divide the mold of the main rubber elastic body 20 in the up-down direction, the front-back direction, and the left-right direction. Thus, it is possible to design the main rubber elastic body 20 with a greater degree of freedom.

For the engine mount 10, the first attachment 32 of the intermediate member 18 is overlapped with the inner face of the tubular part 64 of the outer bracket 14 in an indirect contact state via the covering rubber 58, while the second fixture 44 of the second attachment 34 of the intermediate member 18 is overlapped with the upper end wall 76 of the outer bracket 14 in a direct contact state. As a result, the deformation rigidity of the intermediate member 18 is reinforced by the outer bracket 14. Therefore, sufficient deformation rigidity is ensured although the intermediate member 18 is in a plate form, and the intermediate member 18 can be thinned in order to lighten it.

Since the bent part 30 is provided in the intermediate member 18, the deformation rigidity of the intermediate member 18 itself also improves. In addition, the first attachment 32 and the second attachment 34 provided on both sides of the bent part 30 are fixed to the outer bracket 14 respectively by the first fixture 36 and the second fixture 44. As a result, the fixation strength of the intermediate member 18 to the outer bracket 14 can be obtained largely.

In addition, the first fixture 36 and the second fixture 44 are provided on both sides of the bent part 30 separately from the bent part 30. Particularly in the present practical embodiment, the first fixture 36 is provided at the lower end portion and the front end portion of the intermediate member 18, while the second fixture 44 is provided at the upper end portion and the back end portion of the intermediate member 18. Therefore, a large distance is secured between the first fixture 36 and the second fixture 44, so that the fixation strength of the intermediate member 18 to the outer bracket 14 and the load bearing capability in relation to an input can be advantageously obtained.

The engine mount 10 has a structure wherein the intermediate member 18 inserted in the inner hole 66 of the tubular part 64 is fastened by clinching and using the bolts to the outer bracket 14 at the first and second fixtures 36, 44. Consequently, although the inner hole 66 of the tubular part 64 of the outer bracket 14 has a substantially rectangular cross sectional shape, stress concentration, etc. on the corner portions, which is a problem in press-fit securing, cannot occur. Therefore, it is easy to assemble the mount main unit 12 and the outer bracket 14, and it is possible to prevent the intermediate member 18 from being damaged by the stress in the assembly.

The first fixture 36 of the intermediate member 18 is provided axially outside the tubular part 64 of the outer bracket 14, whereby the first attachment 32 overlapped with the inner face of the tubular part 64 can be readily fixed to the outer bracket 14.

The clinching claws 46 provided in the second fixture 44 of the intermediate member 18 are inserted through the clinching holes 80 formed in the upper end wall 76 of the outer bracket 14. The clinching claws 46 are bent and axially engaged in the upper end wall 76, whereby the second attachment 34 of the intermediate member 18 is fixed to the outer bracket 14. Therefore, a separate fixing member such as a bolt is unnecessary in the second fixture 44, and the second attachment 34 of the intermediate member 18 can be easily fixed to the outer bracket 14.

Especially in the present practical embodiment, since the clinching claw 46 is in the form of a plate which spreads inclining relative to both the up-down direction and the left-right direction. This improves the load bearing capability in relation to inputs in the up-down direction and the left-right direction, in the clinching fastening structure of the second fixture 44 using the clinching claws 46.

Protrusions 42 protruding outward in the left-right direction are provided at both left and right end portions of the first attachment 32 in the intermediate member 18, and each has a curved shape that inclines upward as it goes to the left-right outside. Thus, the spring characteristics of the first connecting portion 50 is adjusted by bonding the first connecting portion 50 of the main rubber elastic body 20 to the left-right inner faces of the protrusions 42. In particular, the protruding dimension, the inclination angle, the axial width dimension, and the like of the protrusion 42 are set as appropriate in the part where the first connecting portion 50 is bonded. This makes it possible to efficiently adjust the spring characteristics of the first connecting portion 50. In the present practical embodiment, the first connecting portion 50 is bonded to the almost entire protrusion 42, and the front portion of the protrusion 42 is larger in protruding dimension than the back portion thereof, whereby the spring characteristics of the first connecting portion 50 is adjusted.

The practical embodiment of the present invention has been described in detail above, but the present invention is not limited by the specific description of the practical embodiment. For example, as long as the intermediate member is fixed in a state of being inserted without being press-fitted in the tubular part 64 of the outer bracket 14, it may have a third attachment vertically opposed to the first attachment 32 and a fourth attachment connected to the left-right end portions of the first and second attachments 32, 34, etc., in addition to the first attachment 32 and the second attachment 34. In summary, as long as the intermediate member has a portion provided with the first attachment and the second attachment on both sides of the bent part, the specific structure of the other portions can be changed as appropriate. It is not always necessary that the first attachment 32 is overlapped with the lower portion of the tubular part 64. For example, the first attachment 32 may be overlapped on the inner face of the upper side portion of the tubular part 64.

Also, the inner hole of the tubular part of the outer bracket is not necessarily limited to one with a substantially rectangular cross section, and it is possible to employ other hole cross sectional shapes including an oval cross section, for example. The first attachment of the intermediate member to be overlapped with the inner face of the tubular part has a shape that can be superposed on the inner face of the tubular part depending on the cross sectional shape of the inner hole of the tubular part.

In addition, the fixation structures of the first fixture 36 and the second fixture 44 to the outer bracket 14 shown in the above practical embodiment are merely examples, and they are not especially limited. Specifically, for example, it is possible to use a clinching fastening structure using a clinching claw in the first fixture, and it is also possible to use a bolt fixing structure in the second fixture. In addition to the clinching and bolt fixing as described above, it is also possible to employ a fixation structure with rivets or a fixation structure by welding, and the like.

The first fixture is not necessarily provided to project outward in the axial direction with respect to the tubular part of the outer bracket. Alternatively, it is possible that the first fixture is provided in the face of the first attachment to be superposed on the inner face of the tubular part so that the first attachment is fixed to the peripheral wall portion of the tubular part by the first fixture. In the above-described practical embodiment, the first and second fixtures are provided at the end portions of the first and second attachments opposite to the bent part, whereby the fixation strength of the first and second attachments to the outer bracket improves and the reinforcement effect improves. However, the technical effect such as improvement in the fixation strength to the outer bracket can be achieved effectively to some extent, if the first and second fixtures are provided in the opposite sides to the bent part in the first and second attachments, that is, locations closer to the ends opposite to the bent part in the first and second attachments than to the bent part.

The number, arrangement, shape, and the like of the clinching claws constituting the second fixture can be changed. For example, it is possible as well that a clinching claw is provided at each of the left and right end portions and the upper end portion of the second attachment so that the second attachment and the outer bracket are fixed by the clinching claws at three positions.

Further, in the above-described practical embodiment, there is shown, as an example, the structure wherein the second attachment 34 is superposed and abutted on the upper end wall 76, which is the end wall of the outer bracket 14, in the upper end portion thereof, i.e., the second fixture 44. Alternatively, the second attachment may be superposed and abutted on the end wall, in a generally whole face thereof, or in a section thereof separate from the second fixture.

Moreover, the first attachment may be overlapped with the inner face of the tubular part of the outer bracket in a direct contact state. Furthermore, the second attachment may be overlapped with the end wall of the outer bracket, in an indirect contact state via a rubber or the like.

What is claimed is:

1. A vibration damping device comprising:
   an inner member;
   an outer bracket including:
   a clinching hole,
   a tubular part having an inner hole, and
   an end wall covering an opening of the tubular part;
   an intermediate member having (i) a bent part, and (ii) a first attachment and a second attachment provided at opposite sides of the bent part, the intermediate member being inserted in the inner hole of the tubular part of the outer bracket such that the first attachment is superposed on an inner face of the tubular part while the second attachment is axially superposed on the end wall of the outer bracket;
   a main rubber elastic body elastically connecting the tubular part of the outer bracket and an end portion of the inner member inserted in the inner hole of the tubular part, the main rubber elastic body elastically connecting and bonded to the inner member and the intermediate member, the main rubber elastic body being bonded to the first attachment and the second attachment;
   a first fixture of the first attachment, the first attachment being fixed to the outer bracket via the first fixture; and
   a second fixture of the second attachment, the second attachment being fixed to the outer bracket via the second fixture, at least one of the first fixture and the second fixture including a clinching claw, the clinching claw being inserted through the clinching hole and fastened to the outer bracket by clinching the outer bracket.

2. The vibration damping device according to claim 1, wherein:
   the first fixture of the first attachment is disposed on a side of the first attachment opposite to the bent part, and
   the second fixture of the second attachment is disposed a side of the second attachment opposite to the bent part.

3. The vibration damping device according to claim 1, wherein the inner hole of the tubular part of the outer bracket has a rectangular cross section.

4. The vibration damping device according to claim 1, wherein:
   the first fixture extends radially outward at an axial outer side of the tubular part of the outer bracket, and
   the first fixture is axially superposed on and fixed to the outer bracket.

5. A vibration damping device comprising:
   an inner member;
   an outer bracket including:
   a tubular part having an inner hole, and
   an end wall covering an opening of the tubular part;
   an intermediate member having (i) a bent part, and (ii) a first attachment and a second attachment provided at opposite sides of the bent part, the intermediate member being inserted in the inner hole of the tubular part of the outer bracket such that the first attachment is superposed on an inner face of the tubular part while the second attachment is axially superposed on the end wall of the outer bracket;
   a main rubber elastic body elastically connecting the tubular part of the outer bracket and an end portion of the inner member inserted in the inner hole of the tubular part, the main rubber elastic body elastically connecting and bonded to the inner member and the intermediate member, the main rubber elastic body being bonded to the first attachment and the second attachment, the first attachment including a protrusion protruding from opposite sides of the tubular part in a peripheral direction of the tubular part of the outer bracket, and the main rubber elastic body is bonded to the protrusion;
   a first fixture of the first attachment, the first attachment being fixed to the outer bracket via the first fixture; and
   a second fixture of the second attachment, the second attachment being fixed to the outer bracket via the second fixture.

6. The vibration damping device according to claim 5, wherein a protruding dimension of the protrusion changes in a part where the main rubber elastic body is bonded to the first attachment and the second attachment.

* * * * *